(12) United States Patent
Hsiao et al.

(10) Patent No.: US 8,837,084 B2
(45) Date of Patent: Sep. 16, 2014

(54) PERPENDICULAR MAGNETIC WRITE HEAD HAVING A HULL SHAPED STITCHED POLE

(71) Applicant: HGST Netherlands B.V., Amsterdam (NL)

(72) Inventors: Wen-Chien D. Hsiao, San Jose, CA (US); Aron Pentek, San Jose, CA (US); Katalin Pentek, San Jose, CA (US); Junsheng Yang, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 40 days.

(21) Appl. No.: 13/689,539

(22) Filed: Nov. 29, 2012

(65) Prior Publication Data

US 2014/0146421 A1    May 29, 2014

(51) Int. Cl.
*G11B 5/127*    (2006.01)
*G11B 21/18*    (2006.01)

(52) U.S. Cl.
CPC ............... *G11B 5/127* (2013.01); *G11B 21/18* (2013.01)
USPC ............................................... 360/125.06

(58) Field of Classification Search
CPC ................................................... G11B 5/1278
USPC .............. 360/125.02, 125.04, 125.06, 125.08
See application file for complete search history.

(56) References Cited

U.S. PATENT DOCUMENTS

| | | | |
|---|---|---|---|
| 5,075,280 A | 12/1991 | Pisharody et al. | |
| 6,757,141 B2 | 6/2004 | Santini et al. | |
| 7,130,153 B2 | 10/2006 | Shen et al. | |
| 7,428,123 B2 | 9/2008 | Kameda | |
| 7,558,019 B2 | 7/2009 | Le et al. | |
| 7,580,222 B2 * | 8/2009 | Sasaki et al. | 360/125.06 |
| 7,599,152 B2 | 10/2009 | Guan et al. | |
| 7,889,456 B2 | 2/2011 | Jiang et al. | |
| 8,107,191 B2 * | 1/2012 | Im et al. | 360/125.06 |
| 2004/0090704 A1 * | 5/2004 | Matono et al. | 360/126 |

OTHER PUBLICATIONS

Hamaguchi et al., "Perpendicular Magnetic Recording Integration and Robust Design," IEEE Transactions on Magnetics, Feb. 2007, vol. 43, Issue 2, abstract only.

* cited by examiner

*Primary Examiner* — Angel Castro
(74) *Attorney, Agent, or Firm* — Zilka-Kotab, PC

(57) ABSTRACT

A magnetic write head having a stitched magnetic pole (also referred to as a shaping layer) for conducting magnetic flux to the pole tip portion of a magnetic write pole. The stitched magnetic pole has a shape so as to be thicker in a central region that is aligned with the pole tip of the write pole and is thinner a its outer sides. This shape helps to channel magnetic flux to the pole tip portion of the write pole while maintaining sufficient pole surface area for high data rate recording.

20 Claims, 5 Drawing Sheets

PERPENDICULAR MAGNETIC WRITE HEAD HAVING A HULL SHAPED STITCHED POLE

FIELD OF THE INVENTION

The present invention relates to magnetic data recording, and more particularly to a perpendicular magnetic write head having a shaping layer (e.g. stitched magnetic pole) configured for improved magnetic flux concentration for improved data rate performance.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

A magnetoresistive sensor such as a Giant Magnetoresistive (GMR) sensor or a Tunnel Junction Magnetoresisive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When it sense current is conducted through the spin valve sensor, resistance changes cause potential changes that are detected and processed as playback signals.

The write head includes at least one coil, a write pole and one or more return poles. When a current flows through the coil, a resulting magnetic field causes a magnetic flux to flow through the write pole, which results in a magnetic write field emitting from the tip Of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

The design of a magnetic write head involves several conflicting design parameters. For example, in order to maximize data density it is necessary to minimize the size of the data bits. This requires reducing the width and height (track width and bit length) of the tip of the write pole at the air bearing surface. However, the strength of the write field from the tip of the write pole must also be strong enough to magnetize the high coercivity magnetic media, and as data density increases the coercivity of the media must also be increased to ensure that the recorded bits are stable. As the size of the write pole shrinks to accommodate the writing of ever smaller bits, it becomes even harder to produce a sufficiently strong write field to write to the media. Therefore, there remains a need for a write head design that can achieve all of these competing goals to effectively write data at a very high data rate and data density.

SUMMARY OF THE INVENTION

The present invention provides a magnetic write head that includes a magnetic write pole having pole tip that extends to an air bearing, surface, and a magnetic pole formed adjacent to the magnetic write pole and having a front end that is recessed from the air bearing surface. The magnetic pole has a center portion and laterally opposed outer portions, the center portion being thicker than the laterally opposed outer portions.

The magnetic pole, which can be referred to as a shaping layer or a stitched pole, conducts magnetic flux to the pole tip of the write pole. The magnetic pole can be configured to have a cross section along a plane parallel with the ABS that is shaped like a boat hull, having a substantially flat upper (or trailing) surface adjacent to the write pole and a curved, convex bottom (or leading surface). This magnetic pole shape advantageously focuses magnetic flux to the pole tip of the magnetic write pole while also having a large surface area for improved high data rate writing.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
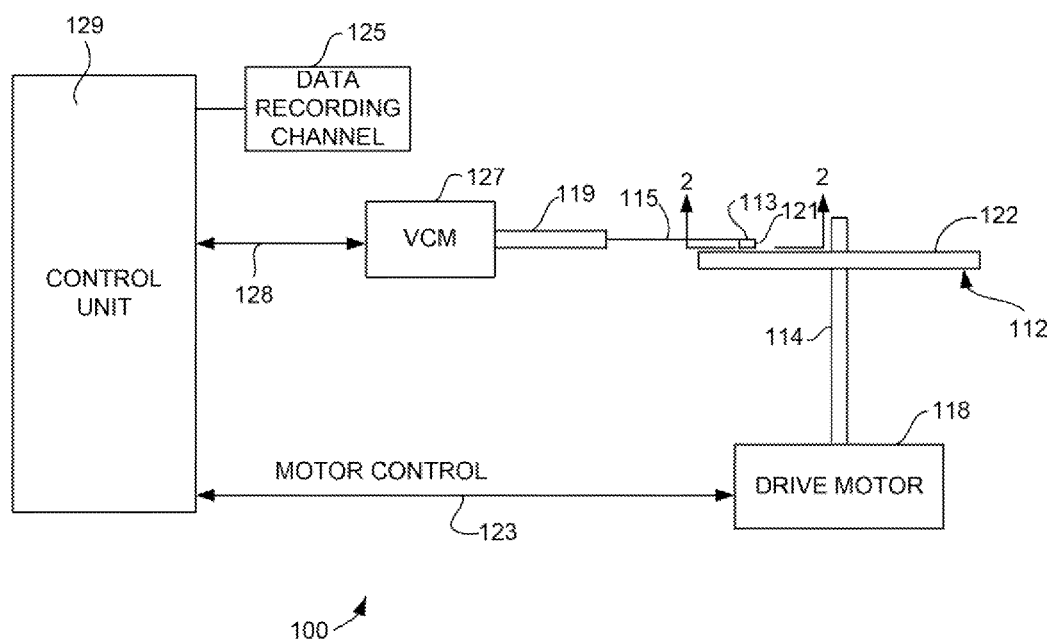
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
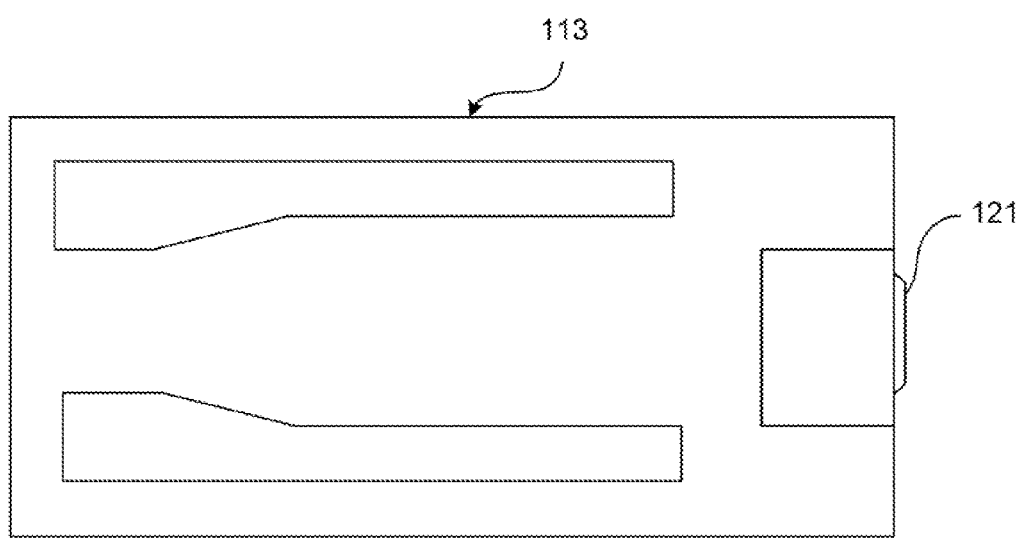
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head 121 including an inductive write head and a read sensor, is located at a trailing edge of the slider. The above description of a typical magnetic disk storage system and the accompanying illustration of FIG. 1 are fir representation purposes only. It should be apparent that disk storage systems may contain a large number of disks and actuators, and each actuator may support a number of sliders.

Figure 3:
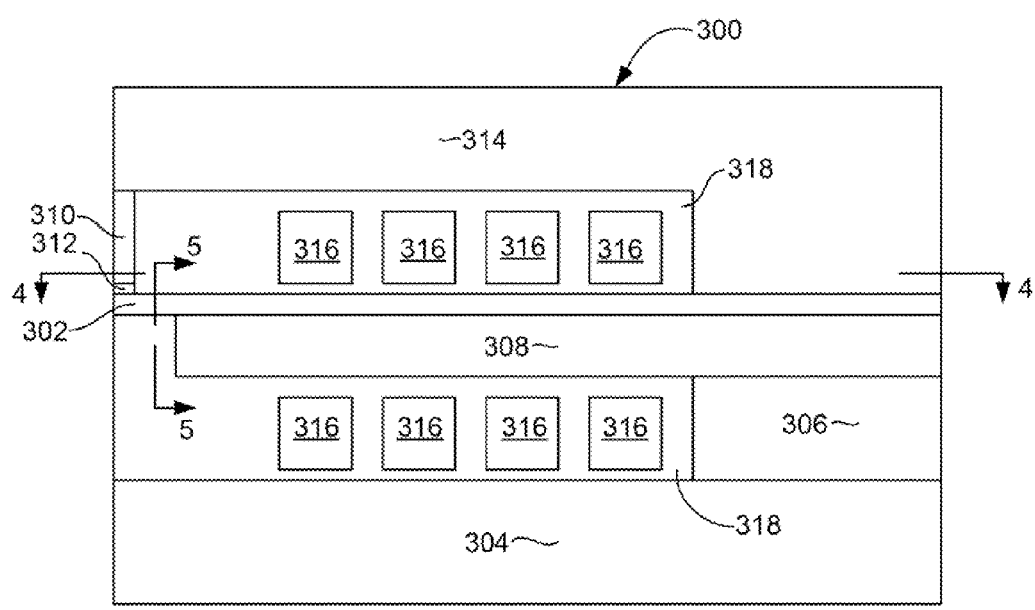
FIG. 3 is a schematic cross-sectional view of a magnetic head according to a possible embodiment of the invention.

FIG. 3 shows a side cross sectional schematic view of a magnetic write head 300. The write head 300 includes a magnetic write pole 302, and a leading, magnetic return pole 304. The leading magnetic return pole 304 can be magnetically connected with the write pole 302 by a magnetic back gap layer 306 and by a stitched magnetic pole 308 (also referred to as a shaping layer) that contacts the write pole 302.

With continued reference to FIG. 3, the write head 300 can also include a trailing magnetic shield 310 that is separated from the trailing edge of the write pole 302 by a thin non-magnetic trailing gap layer 312. The trailing shield 310 can be connected with the back of the write head 300 (e.g., with the back of the write pole 302 and shaping layer 308 and back gap layer 306) by a trailing magnetic return pole 314.

A magnetic write coil 316 is shown in cross section in FIG. 3. The write coil 316 can be constructed of a non-magnetic, electrically conducive material such as Cu and can pass above and below the write pole 302. The write coil 316 is embedded in a non-magnetic, electrically conductive material such as alumina 318. When an electrical current flows through the write coil 316 a resulting, magnetic field causes a magnetic flux to flow through the write pole 302. This magnetic field emits from the tip of the write pole 302 to magnetize a magnetic layer of a magnetic media (not shown in FIG. 3). The magnetic flux travels through the magnetic media to return to the return pole 304 where it is sufficiently spread out and weak that it does not erase the previously recorded data bit, The presence of the trailing shield increases the write field gradient which improves magnetic switching speed.

Figure 4:
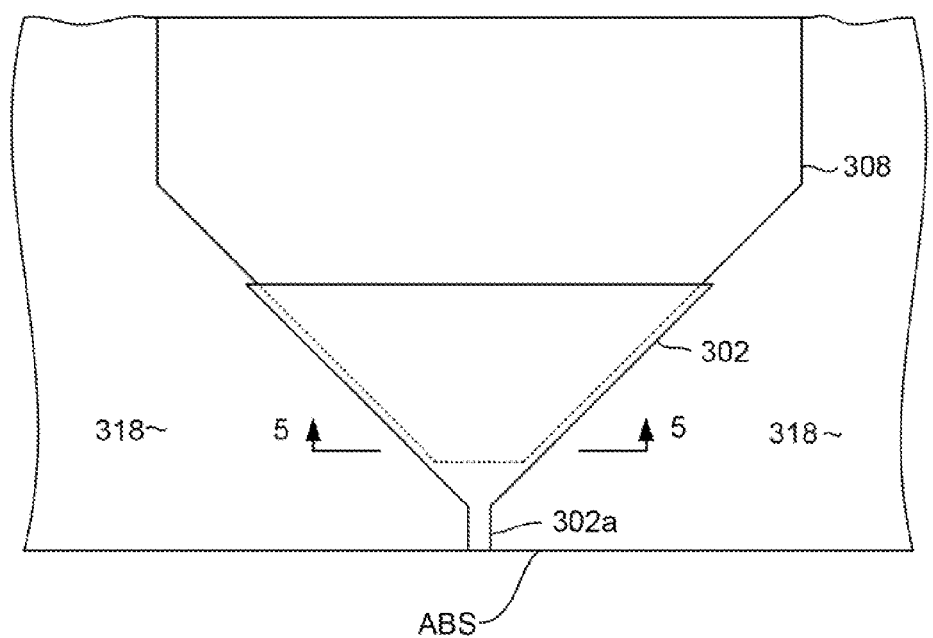
FIG. 4 is a top down view of a write pole and shaping layer of the magnetic head of FIG. 3 as seen from line 4-4 of FIG. 3.

FIG. 4 shows a top down view of the write pole 302 and stitched pole 308. As can be seen, the write pole 302 has a pole up portion 302a that extends to the air bearing surface ABS and has a flared portion that starts at a location slightly removed from the ABS, The stitched pole 308 is beneath the write pole 302. A portion of the stitched pole is shown in dashed line to indicate that it passes beneath the write pole 302 in FIG. 4.

While the write pole 302 extends to the ABS, the stitched pole 308 terminates at a location that is recessed from the ABS. Also, as can he seen, the stitched pole 308 can be formed with a flared portion to help to channel magnetic flux to the tip of the write pole.

Figure 5:
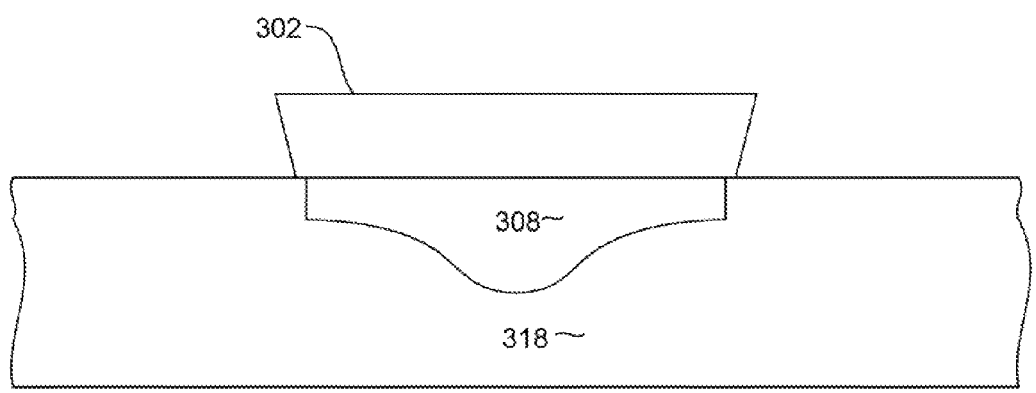
FIG. 5 is a cross sectional view of a plane parallel with the ABS of the write pole and shaping layer as seen from line 5-5 of FIGS. 3 and 4.

FIG. 5 shows a cross sectional view of a plane parallel with the air bearing surface (ABS) at a location recessed from the ABS as taken along line 5-5 of FIG. 4. in FIG. 5 it can be seen that the stitched pole 308 is thinner at its outer sides and is thicker at its middle beneath and adjacent to the center of the write pole 302. In this sense, the cross section of the stitched magnetic pole 308 resembles the hull of a boat with a curved, concave bottom that is deeper at its center. The thicker central portion of the pole 308 is preferably 1.2-2.0 times the thickness of the thinner, laterally opposed outer portions.

The thicker convex center portion of the pole 308 is aligned with the pole tip portion of the write pole 302. The pole 308 has a substantially flat upper (or trailing) surface that contacts the leading edge surface of the write pole 302. The pole 308 can be constructed of a material such as NiFe or CoFeNi alloy, This novel shape of the stitched magnetic pole 308 helps to efficiently channel magnetic flux to the tip of the write pole 302, (302a in FIG. 4) thereby providing increased write field. It is advantageous to concentrate the magnetic flux in the center of the stitched pole 302 and reduce the flux carried at the edges. While this effect could be achieved by reducing the width of the stitched pole 308, this would have the undesirable effect of reducing the surface area of the stitched pole, which would inhibit high data rate performance. The above described shape of the stitched pole achieves both goals by concentrating flux at the center of the write pole 302 while also providing ample width to maintain sufficient pole surface area for providing high data rate performance.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only it accordance with the following claims and their equivalents.

What is claimed is:

1. A magnetic write head, comprising:
   a magnetic write pole having pole tip that extends to an air bearing surface; and
   a magnetic pole formed adjacent to the magnetic write pole and having front end that is recessed from the air bearing surface, the magnetic pole having a center portion and laterally opposed outer portions, the center portion being thicker than the laterally opposed outer portions;
   wherein the magnetic pole has a first surface in contact with the magnetic write pole and a second surface that is opposite the first surface, and wherein the first surface is substantially flat and the second surface is curved to form the thicker center portion and thinner laterally opposed outer portions.

2. The magnetic write head as in claim 1 wherein the magnetic pole contacts a surface of the write pole.

3. The magnetic write head as in claim 1 wherein the magnetic write pole has a leading edge surface and wherein the magnetic pole contacts the leading edge surface of the write pole.

4. The magnetic write head as in claim 1 wherein the magnetic pole has a leading edge surface and a trailing edge surface and wherein the trailing edge surface is substantially flat and the leading edge surface is curved to form the thicker center portion and thinner laterally opposed outer portions.

5. The magnetic write head as in claim 1 wherein the thicker center portion of the magnetic pole is aligned with the pole tip portion of the magnetic write pole.

6. The magnetic write head as in claim 1 wherein the magnetic pole is a shaping layer arranged relative to the write pole so as to conduct magnetic flux to the pole tip portion of the magnetic write pole.

7. The magnetic write head as in claim 1 wherein the magnetic pole has a cross section parallel with the air bearing surface that has a straight trailing edge and a curved leading edge so as to resemble the shape of a hull of a boat.

8. The magnetic write head as in claim 1 wherein the magnetic pole has a convex leading edge.

9. The magnetic write head as in claim 1 wherein the magnetic pole comprises NiFe or CoFeNi alloy.

10. The magnetic write head as in claim 1 wherein the magnetic pole is a stitched magnetic that is magnetically connected with a leading edge surface of the magnetic write pole.

11. The magnetic write head as in claim 1 wherein the thickness of the center portion of the magnetic pole is 1.2-2.0 times the thickness of the laterally opposed outer portions of the magnetic write pole.

12. The magnetic write head as in claim 1 further comprising a magnetic return pole, that is magnetically connected with the magnetic write pole and the magnetic pole in a region removed from the air bearing surface.

13. The magnetic write head as in claim 1 wherein the magnetic return pole is magnetically connected with the magnetic pole by a magnetic back gap layer.

14. A magnetic data recording system, comprising:
   a housing;
   a magnetic media, mounted within the housing;
   an actuator;
   a slider connected with the actuator for movement adjacent to a surface of the magnetic media; and
   a magnetic write head connected with the slider, the magnetic write head comprising:
   a magnetic write pole having pole tip that extends to an air bearing surface; and
   a magnetic pole formed adjacent to the magnetic write pole and having front end that is recessed from the air bearing surface, the magnetic pole having a center portion and laterally opposed outer portions, the center portion being thicker than the laterally opposed outer portions;
   wherein the magnetic pole has a first surface in contact with the magnetic write pole and a second surface that is opposite the first surface, and wherein the first surface is substantially flat and the second surface is curved to form the thicker center portion and thinner laterally opposed outer portions.

15. The magnetic write head as in claim 14 wherein the magnetic pole has a convex leading edge surface.

16. The magnetic write head as in claim 14 wherein the magnetic pole contacts a surface of the write pole.

17. The magnetic write head as in claim 14 wherein the thicker center portion of the magnetic pole is aligned with the pole tip portion of the magnetic write pole.

18. The magnetic write head as in claim 14 wherein the magnetic pole has a cross section parallel with the air bearing surface that has a straight trailing edge and a curved leading edge so as to resemble the shape of a hull of a boat.

19. The magnetic write head as in claim 14 wherein the magnetic pole is a stitched magnetic that is magnetically connected with a leading edge surface of the magnetic write pole.

20. The magnetic write head as in claim 14 wherein the thickness of the center portion of the magnetic pole is 1.2-2.0 times the thickness of the laterally opposed outer portions of the magnetic write pole.

* * * * *

UNITED STATES PATENT AND TRADEMARK OFFICE
CERTIFICATE OF CORRECTION

PATENT NO. : 8,837,084 B2  
APPLICATION NO. : 13/689539  
DATED : September 16, 2014  
INVENTOR(S) : Wen-Chien D. Hsiao et al.

Page 1 of 1

It is certified that error appears in the above-identified patent and that said Letters Patent is hereby corrected as shown below:

In the Specification:

Column 1, line 57 replace "it sense" with --a sense--;

Column 3, line 57 replace "fir representation" with --for representation--;

Column 4, line 25 replace "up" with --tip--;

Column 5, line 3 replace "only it" with --only in--.

Signed and Sealed this  
Seventh Day of July, 2015

Michelle K. Lee  
*Director of the United States Patent and Trademark Office*